June 3, 1952  H. TINKER  2,599,500

ADJUSTABLE PARALLEL

Filed Oct. 31, 1949

INVENTOR.
Herbert Tinker.
BY Ross + Ross

Patented June 3, 1952

2,599,500

UNITED STATES PATENT OFFICE 2,599,500

ADJUSTABLE PARALLEL

Herbert Tinker, South Hadley Falls, Mass.

Application October 31, 1949, Serial No. 124,640

1 Claim. (Cl. 33—174)

This invention relates to improvements in tools and is directed particularly to parallels which are adjustable and adapted for use by mechanics.

The principal object of the invention is the provision of tool apparatus in the form of parallels which are adapted for use by machinists, toolmakers and mechanics generally for supporting work for machining operation, laying out, etc.

As a special feature of the invention, the parallel construction is strong and rigid so as to facilitate accuracy of work and efficiency in operation.

The structure is simple in form to facilitate economy in manufacture and is adjustable so as to be adapted for a wide range of uses and may be readily and easily assembled and disassembled.

With the above primary object in view, it is another object of my invention to provide a construction of the above described character which is relatively simple and compact in accordance with the demands and desires of the purchasing public as well as of the manufacturers thereof and which is not only attractive in its appearance and practical in its value but also reliable in its operation and thoroughly efficient in its use.

It is a still further object to provide a device which is constructed of relatively simple parts which are adapted to be readily assembled and which when once assembled are positively and securely retained in operative relationship and which cannot be readily separated from each other, either accidentally or otherwise.

Other prime objects of my invention include: first, the provision of a simplified construction and arrangement of adjustable parallels which is strong, durable and compact in its structure and is distinctive in its appearance; second, the securement of a higher degree of accuracy in the manner of work performed therewith than has heretofore been possible with prior devices known in the art; third, the attainment of a higher degree of speed of construction and assembly of the device due to its simplification in design and its unique composition of parts; fourth, the attainment of a flexibility of a capability of adjustment by which a large variety of work can be produced by means of the same device; fifth, the achievement of a greater ease in adjustment and repairs; sixth, the provision of improved adjustable parallels which may be made more economically and with fewer operations in the manufacture of its parts, as well as in the assembly of the same, than prior devices known in the art, and seventh, the provision of a construction which may be readily installed with respect to the various purposes for which it is intended.

All of the above objects I accomplish by means of such structure and relative arrangement of parts thereof, as will fully appear by a perusal of the description below and by various specific features which will be hereinafter set forth.

To the above cited and other ends and with the foregoing and various other novel features and advantages and other objects of my invention as will become more readily apparent as the description proceeds, my invention consists in certain novel features of construction and in the combination and arrangement of parts as will be hereinafter more particularly pointed out in the claims hereunto annexed and more fully described and referred to in connection with the accompanying drawings wherein:

Figure 1:
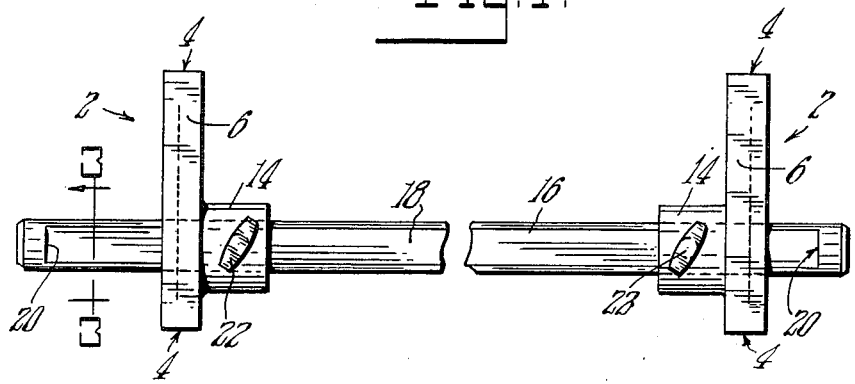
Fig. 1 is a side elevational view of the adjustable parallels embodying the novel features of the invention.
Figure 2:
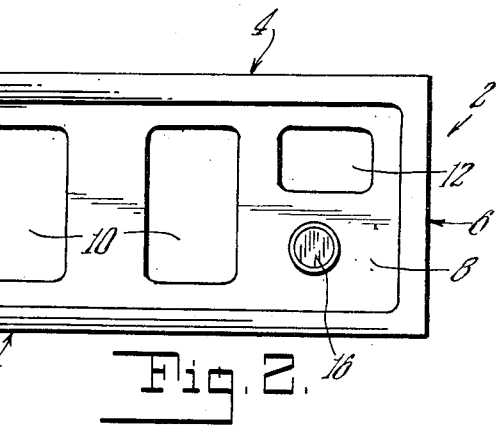
Fig. 2 is an end elevational view of the adjustable parallels shown in Fig. 1.
Figure 3:
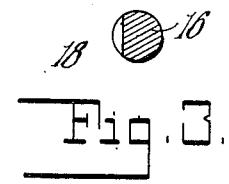
Fig. 3 is a sectional view on the line 3—3 of Fig. 1.

In the above mentioned drawing annexed hereto and forming a part of this specification, I have shown but one embodiment of my invention which is deemed preferable, but it is to be understood that changes and modifications may be made within the scope of the appended claims without departing from the spirit of the invention.

Referring now to the drawing more in detail, and referring more particularly to the preferred form of my invention selected for illustrative purposes, I have shown a pair of similar end members 2 which may be formed to have opposite and adjacent longitudinal and transverse edges 4 and 6.

The members may be cast from various metals or may be otherwise formed as desired.

The edges 4 and 6 are accurately machined so that the opposite edges are parallel with the adjacent edges being in an accurate angular relation.

The edge portions of the members 2 may be of relatively greater width or thickness than the intermediate web portions 8. The web portion may be provided with openings 10 and 12, substantially shown.

Longitudinally spaced hubs 14 extend inwardly from inner adjacent sides of the members 2 which have openings therethrough in which elongated rods 16 are disposed.

The openings for the rods 16 are formed so that the end members and rods are relatively slidable without objectionable looseness or play.

The rods 16 are provided with longitudinal flat sides 18 at least along one side thereof which terminate in shoulders 20 inwardly of and adjacent opposite ends thereof.

Clamp means 22 which may be in the form of screws are in threaded engagement with the hubs 14 of the end members and are adapted in clamping position to bind against the flat sides of the rods to hold the end members and rods against relative movement.

With the edges of the members machined as they are any edge of the member 2 may be supported by a flat surface and moved to adjusted positions relative to the rods and secured thereto by members 22.

The components are easily and readily assembled and disassembled and are as easily adjusted to adapt the structure to many and various uses.

The invention may be embodied in other specific forms without departing from the essential characteristics thereof. Hence, the present embodiments are therefore to be considered in all respects merely as being illustrative and not as being restrictive, the scope of the invention being indicated by the appended claim rather than by the foregoing description and all modifications and variations as fall within the meaning and purview and range of equivalency of the appended claim are therefore intended to be embraced therein.

What it is desired to claim and secure by Letters Patent of the United States is:

Unitary adjustable work supporting parallel apparatus comprising in combination, a pair of similar end members of rectangular shape each having horizontally disposed upper and lower uninterrupted parallel edges and vertically disposed uninterrupted parallel opposite end edges and provided with a pair of hubs extending horizontally inwardly from inner sides thereof, said hubs provided with horizontal bores spaced horizontally and longitudinally of said end members with the bores of one end member disposed in alignment with the bores of the other end member, a pair of elongated cylindrical rods extending through the pairs of bores of the end members on which said end members are slidable towards and away from one another, said rods provided with vertically disposed flat faces extending along the outer sides thereof terminating in stop shoulders adjacent and inwardly of opposite ends of said rods, and binding screws in threaded engagement with said hubs having inner ends for engaging the flat faces of said rods to hold said end members against movement relative to said rods and being engageable by said shoulders to limit movements of said end members away from one another.

HERBERT TINKER.

REFERENCES CITED

The following references are of record in the file of this patent:

UNITED STATES PATENTS

| Number | Name | Date |
| --- | --- | --- |
| 349,840 | Gardner | Sept. 28, 1886 |
| 707,723 | Robbins | Aug. 26, 1902 |
| 1,383,979 | Bryant | July 5, 1921 |
| 1,677,063 | Wagner | July 10, 1928 |
| 2,170,535 | Marsden | Aug. 22, 1939 |
| 2,238,887 | King | Apr. 22, 1941 |
| 2,383,028 | Twardowski | Aug. 21, 1945 |
| 2,473,643 | Froblom | June 21, 1949 |
| 2,527,168 | Wehler | Oct. 24, 1950 |